(12) United States Patent
Knowlton et al.

(10) Patent No.: US 6,508,210 B2
(45) Date of Patent: Jan. 21, 2003

(54) FUEL SUPPLY SYSTEM FOR A VEHICLE INCLUDING A VAPORIZATION DEVICE FOR CONVERTING FUEL AND WATER INTO HYDROGEN

(75) Inventors: James L. Knowlton, Whitehall, MI (US); Alan J. Workman, Spring Lake, MI (US)

(73) Assignee: Tyma, Inc., Spring Lake, MI (US)

( * ) Notice: Subject to any disclaimer, the term of this patent is extended or adjusted under 35 U.S.C. 154(b) by 0 days.

(21) Appl. No.: 09/792,993

(22) Filed: Feb. 26, 2001

(65) Prior Publication Data

US 2001/0013321 A1 Aug. 16, 2001

Related U.S. Application Data

(63) Continuation of application No. PCT/US99/19772, filed on Aug. 27, 1999.
(60) Provisional application No. 60/098,163, filed on Aug. 27, 1998.

(51) Int. Cl.[7] ................................. F02B 43/08
(52) U.S. Cl. ........................... 123/3; 123/306
(58) Field of Search ...................... 123/3, 306

(56) References Cited

U.S. PATENT DOCUMENTS

| | | |
|---|---|---|
| 504,723 A | 9/1893 | Gray |
| 1,311,532 A | 7/1919 | Schmid |
| 1,456,018 A | 5/1923 | Wiegand |
| 1,627,671 A | 5/1927 | Shore |
| 1,724,481 A | 8/1929 | Heginbottom et al. |
| 2,139,777 A | 12/1938 | Skok et al. |
| 2,716,399 A | 8/1955 | Rothwell |
| 3,667,436 A | 6/1972 | Reichhelm |
| 3,682,142 A | 8/1972 | Newkirk |
| 3,920,416 A | 11/1975 | Houseman |
| 4,003,343 A | 1/1977 | Lee |
| 4,008,692 A | 2/1977 | Shinohara et al. |
| 4,133,172 A | 1/1979 | Cataldo |
| 4,187,264 A | 2/1980 | Diener |
| 4,187,819 A | 2/1980 | Longobardi |

(List continued on next page.)

*Primary Examiner*—Gene Mancene
*Assistant Examiner*—Hyder Ali
(74) *Attorney, Agent, or Firm*—Price, Heneveld, Cooper, DeWitt & Litton (57) ABSTRACT

A fuel supply system is disclosed for use with a vehicle propulsion system such as an internal combustion engine or a fuel cell system. The fuel supply system includes a water supply, fuel supply, and fuel conversion device coupled to the water and fuel supplies for generating hydrogen from the water and fuel and supplying the hydrogen to an intake manifold of the propulsion system with which the fuel supply system is used. The fuel conversion device preferably includes a vaporization chamber, an inlet nozzle for introducing fine droplets of fuel and water into the vaporization chamber, an air inlet for introducing air into the vaporization chamber to create turbulence in the chamber, a heater in the vaporization chamber for heating the turbulent fuel/water mix at temperatures that cause the mix to convert into hydrogen, and an outlet for supplying the generated hydrogen and air to the vehicle propulsion system.

22 Claims, 5 Drawing Sheets

U.S. PATENT DOCUMENTS

| | | |
|---|---|---|
| 4,192,270 A | 3/1980 | Beckman |
| 4,224,904 A | 9/1980 | Clerk |
| 4,256,060 A | 3/1981 | Kelly |
| 4,336,783 A | 6/1982 | Henson |
| 4,348,338 A | 9/1982 | Martinez et al. |
| 4,355,622 A | 10/1982 | Inoue |
| 4,368,163 A | 1/1983 | Covey, Jr. |
| 4,375,801 A | 3/1983 | Eckman |
| 4,379,443 A | 4/1983 | Granger |
| 4,409,951 A | 10/1983 | Whitworthl |
| 4,412,521 A | 11/1983 | Silva, Jr. |
| 4,438,750 A | 3/1984 | Sviridov et al. |
| 4,463,742 A | 8/1984 | Williams |
| 4,476,817 A | 10/1984 | Lindberg |
| 4,491,552 A | 1/1985 | Wessel |
| 4,538,583 A | 9/1985 | Earl |
| 4,597,363 A | 7/1986 | Emelock |
| 4,637,365 A | 1/1987 | Yunick |
| 4,870,249 A | 9/1989 | Kayanuma et al. |
| 4,883,040 A | 11/1989 | Rocky |
| 5,038,742 A | 8/1991 | Uddin |
| 5,085,176 A | 2/1992 | Brinkley, III |
| 5,092,303 A | 3/1992 | Brown |
| 5,123,398 A | 6/1992 | Klaus et al. |
| 5,156,114 A | 10/1992 | Gunnerman |
| 5,207,185 A | 5/1993 | Greiner et al. |
| 5,218,944 A | 6/1993 | Leonard |
| 5,229,102 A | 7/1993 | Minet et al. |
| 5,299,536 A | 4/1994 | Moard et al. |
| 5,320,519 A | 6/1994 | Bang et al. |
| 5,379,728 A | 1/1995 | Cooke |
| 5,398,663 A | 3/1995 | Kulasinghe |
| 5,437,250 A | 8/1995 | Rabinovich et al. |
| 5,666,929 A | 9/1997 | Knowlton et al. |
| 6,209,494 B1 * | 4/2001 | Manikowski, Jr. et al. ..... 123/3 |
| 6,332,434 B1 * | 12/2001 | De Souza et al. ............... 123/3 |
| 6,336,430 B2 * | 1/2002 | De Souza et al. ............... 123/3 |

* cited by examiner

FUEL SUPPLY SYSTEM FOR A VEHICLE INCLUDING A VAPORIZATION DEVICE FOR CONVERTING FUEL AND WATER INTO HYDROGEN

CROSS-REFERENCE TO RELATED APPLICATIONS

This application is a continuation under 35 U.S.C. §120 of International PCT Application No. PCT/US99/19772, filed on Aug. 27, 1999, which claims priority under 35 U.S.C. §119(e) upon U.S. Provisional Patent Application No. 60/098,163, filed on Aug. 27, 1998. The entire disclosures of both the above-referenced PCT and provisional applications are incorporated herein by reference.

BACKGROUND OF THE INVENTION

The present invention generally relates to a fuel supply system for a vehicle and more particularly to a system supplying fuel to an internal combustion engine or fuel cell of an automotive vehicle.

Ever since the advent of automotive vehicles, those who design and manufacture automotive vehicles have had the goal of producing a propulsion system that minimizes use of fossil fuels and does not generate byproducts that are harmful to humans or the environment. The majority of conventional automotive vehicles include an internal combustion engine that is fueled by gasoline or diesel fuel. These automotive vehicles generally can travel relatively significant distances between refueling and can obtain up to about 50 miles per gallon of gasoline. Typically, however, such fuel economy can only be achieved at the expense of power and size of the vehicle. Also, conventional internal combustion engines contribute significant amounts of pollution to the environment, particularly in large cities where there are many vehicles on the road. Further, the exhaust from these engines includes dangerous levels of carbon monoxide.

One approach to solve some of the above problems is to feed the supply of fuel through a vaporization device so as to vaporize the fuel prior to introducing it to the internal combustion engine. By first vaporizing the fuel, greater fuel economy can be obtained while reducing harmful exhaust emissions. Examples of such vaporization devices are disclosed in commonly assigned U.S. Pat. Nos. 5,123,398 and 5,666,929. It was believed that the fuel burns more efficiently and completely when introduced to the engine as vapor. One problem experienced with the use of such vaporization devices is that the spark plugs, engine cylinders, and valves would quickly become blackened with soot, which was believed to be carbon.

An alternative approach to solving the above environmental problems with internal combustion engines is to power the vehicles with an electric motor. Electricity to drive the motor is supplied from a number of batteries in a true electric vehicle. A problem with such electric vehicles is that they do not have the range of a vehicle powered by an internal combustion engine. Also, the batteries may take a relatively long time to recharge. Because people have grown accustomed to the greater range and refueling convenience of vehicles powered with internal combustion engines, electric vehicles have not been widely accepted by the public.

To increase the range of a vehicle powered with an electric motor, a hybrid electric vehicle has been developed. In a hybrid electric vehicle, a small internal combustion engine is provided to run an alternator that recharges the batteries as the vehicle is being driven. In some forms of hybrid electric vehicles, both the batteries and the alternator driven by the small internal combustion engine, power the electric motor. Because the internal combustion engine in a hybrid vehicle need only drive the alternator at a constant speed, the engine may be much smaller and lighter than a conventional internal combustion engine. While hybrid electric vehicles show much promise, they nevertheless still utilize an engine that pollutes the atmosphere and generates dangerous levels of carbon monoxide.

Another type of system for powering a vehicle utilizes a fuel cell. Fuel cells consume a constant supply of fuel to generate electricity for driving an electric motor. Typical fuel cells include an anode and a cathode and operate by feeding a supply of hydrogen through a separator membrane between the anode and the cathode so as to generate electricity through a redox reaction. Fuel cells are drawing a great deal of interest because of their fuel economy and their lack of polluting byproducts. Fuel supply systems for such fuel cells are known that generate the supply of hydrogen from supplies of gasoline and water. However, because fuel supply systems can take up to ten minutes to warm up and generate sufficient quantities of hydrogen to fuel the fuel cell and hence drive the electric motor, large and expensive batteries must be provided in the vehicle to generate sufficient electricity for initial travel following start-up. Currently, fuel cells are too expensive for production due to the need for the expensive batteries required for start-up.

Another fuel supply system proposed for vehicles is to power internal combustion engines with alternative fuels, such as alcohol, ethanol, methane, and hydrogen, so as to reduce the presence of environmentally harmful exhaust gasses. The use of alternative fuels has not become commercialized, however, due to their requirements that the current infrastructure would require change. For example, gas stations would have to all change and begin offering these alternative fuels in addition to gasoline since vehicles consuming gasoline would still be in existence. Also, alternative fuels such as methane and hydrogen are combustible gasses that would have to be stored in a pressurized container within the vehicle and, therefore, would pose a severe danger to the vehicle occupants.

It has been proposed that internal combustion engines may be run on hydrogen that is produced by converting hydrocarbon fuel into hydrogen. See, for example, U.S. Pat. Nos. 3,682,142; 4,476,817; 4,008,692; 4,003,343; 3,920,416; 5,379,728; 5,085,176; 5,207,185; 5,092,303; and 5,156,114. In some of these systems, heat from the engine exhaust is used to convert the hydrocarbons to hydrogen. Clearly, such systems cannot immediately generate hydrogen when the engine is cold or on ignition start-up. Some of these systems rely upon an expensive catalyst, such as platinum, to convert hydrocarbons to hydrogen. At least one of these systems burns hydrogen supplied from a pressurized storage tank to supply heat for the conversion. Again, the use of such pressurized hydrogen storage tanks is not desirable due to the hazard it presents. Additionally, some of these disclosed systems mix steam with the fuel to generate hydrogen and reduce pollutants. However, the heat required to produce steam from stored water, which may be cold, is not immediately available on cold engine start-up.

SUMMARY OF THE INVENTION

Accordingly, an aspect of the present invention is to provide a fuel supply system that does not require changes in the current fuel distribution infrastructure and yet obtains significantly better fuel economy than vehicles currently available. It is another aspect of the present invention to provide a fuel supply system that exhausts significantly less carbon monoxide and NOX than conventional internal combustion engines. An additional aspect of the present invention is to provide a fuel supply system that may be used to supply fuel to current internal combustion engines. Yet another aspect of the present invention is to provide a fuel supply system that uses widely available forms of gasoline or diesel fuel. The fuel supply system of the present invention may also use other forms of fuel such as methane, ethane, or alcohol.

It is another aspect of the invention to provide a system for supplying hydrogen to an internal combustion engine without requiring pressurized storage of hydrogen. Yet another aspect of the invention is to provide a hydrogen fuel delivery system which allows immediate start-up of a cold engine and which does not rely upon heat of the engine to convert hydrocarbon fuel into hydrogen.

To achieve these and other aspects and advantages, the fuel supply system of the present invention as used for an internal combustion engine comprises a water supply for supplying water, an air inlet, a fuel supply for supplying fuel, and a conversion device coupled to the water and fuel supplies and the air inlet for generating hydrogen from the water and fuel, and supplying the hydrogen to an intake manifold of the internal combustion engine. The conversion device includes heating means for simultaneously heating the water and fuel to a temperature at which the water and fuel convert to hydrogen. Successful experimental tests conducted on a prototype engine system confirm these objectives.

Another aspect of the present invention is to provide a fuel supply device for a fuel cell that can supply hydrogen to the fuel cell immediately upon vehicle start-up to thereby eliminate the need for expensive batteries to provide electricity to the electric motor while the fuel supply system warms up. Still another aspect of the present invention is to provide a fuel supply device for a fuel cell that generates hydrogen from gasoline and water. To achieve these and other aspects and advantages, the fuel supply apparatus of the present invention as used for supplying fuel to a vehicle propulsion system comprises a vaporization chamber, an inlet nozzle for introducing fine droplets of fuel and water into the vaporization chamber, an air inlet for introducing air into the vaporization chamber to create turbulence in the chamber, an electrical heater in the vaporization chamber for heating the turbulent fuel/water mix at a temperature that causes the mix to convert into hydrogen and harmless byproducts, and an outlet for supplying the generated hydrogen to the vehicle propulsion system.

These and other features, advantages, and objects of the present invention will be further understood and appreciated by those skilled in the art by reference to the following specification, claims, and appended drawings.

DETAILED DESCRIPTION OF THE PREFERRED EMBODIMENTS

Figure 1:
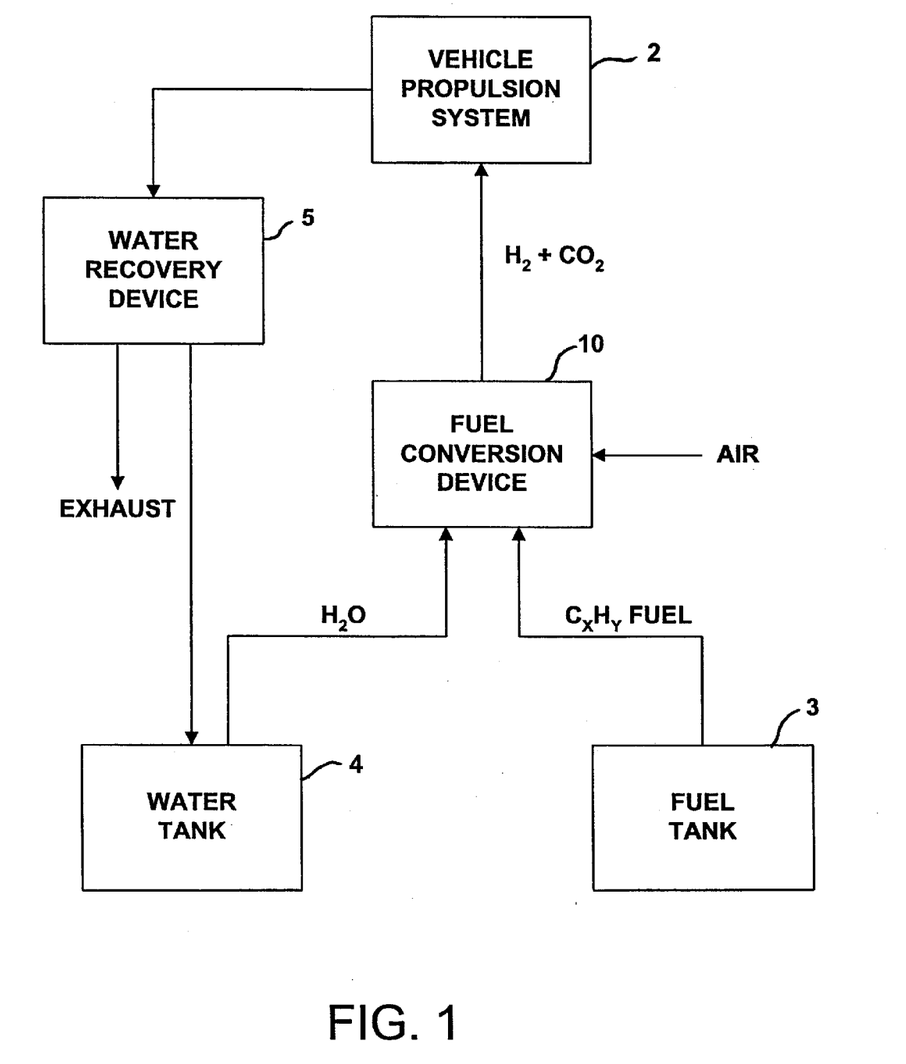
FIG. 1 is a block diagram illustrating an overview of the fuel supply system of the present invention as used with any generic propulsion system.

FIG. 1 shows the fuel supply system 1 of the present invention as used with any generic vehicle propulsion system 2. As shown, fuel supply system 1 includes a fuel tank 3, a water tank 4, a fuel conversion device 10, and an optional water recovery device 5. As explained in more detail below, fuel tank 3 and water tank 4 are coupled to fuel conversion device 10 to supply both water and fuel continuously in a predetermined ratio. Fuel conversion device 10 vaporizes the fuel and water and thereby generates hydrogen from the vaporized mix. The output of fuel conversion device 10 is coupled to a fuel intake 20 of propulsion system 2 to receive the hydrogen generated by fuel conversion device 10.

The inventive fuel supply system 1 may be used to supply hydrogen to any type of propulsion system capable of running on a supply of hydrogen. Examples of such propulsion systems are internal combustion engines and fuel cells. The contemplated internal combustion engines with which the inventive fuel supply system may be used include those which directly drive the vehicle's wheels and those which drive an alternator of a hybrid vehicle. Thus, the inventive fuel system may be used to supply fuel to virtually any of today's production internal combustion engines including diesel engines, preferably provided that spark plugs are added.

When used to fuel an internal combustion engine, the output of the fuel conversion device is directly coupled to the intake manifold of the engine. The vacuum created by the engine is sufficient to draw the hydrogen out of fuel conversion device 10. When used to supply hydrogen to a fuel cell, a compressor or some other device may be added to pump the hydrogen to the intake of the fuel cell.

The fuel supplied from fuel tank 3 may be any hydrocarbon fuel such as conventional gasoline, diesel fuel, ethane, alcohol, or methane. Preferably, the fuel is one that is already readily available in gas stations. Ideally, the fuel is gasoline, but with many of the current additives such as anti-knock additives removed, since the generated hydrogen does not cause knock and thus does not require an anti-knock additive.

The water supplied is preferably distilled water so as to eliminate possibly harmful exhaust byproducts. Because the exhaust of the propulsion system includes significant amounts of water vapor when supplied with fuel from the inventive fuel supply system, the system may include a water recovery device 5 such as a condenser to convert the water vapor in the exhaust back into water. The recovered water may be fed back to water tank 4 for reuse. It is estimated that up to 80 percent of the water supplied to fuel conversion device 10 may be recovered from the exhaust of the propulsion system. Thus, water tank 4 may be made much smaller and lighter relative to fuel tank 3 despite the fact that nearly equal amounts of fuel and water are supplied to fuel conversion device 10.

The ratio of fuel to water to obtain optimum results depends upon the type of hydrocarbon fuel used, as apparent from the reaction equations listed below. In reaction equation (1), the hydrocarbon fuel was mixed with heat and water vapor to form hydrogen and carbon monoxide.

$$C_xH_y + (X)H_2O + Heat \rightarrow (X+0.5Y)H_2 + (X)CO \qquad \text{Equation 1:}$$

As shown in reaction equation (2) below, the undesirable carbon monoxide may be converted to carbon dioxide by exposing it to additional water vapor. Consequently, more hydrogen is produced.

$$CO + H_2O \rightarrow CO_2 + H_2 \qquad \text{Equation 2:}$$

Thus, equation (1) becomes:

$$C_xH_y + (2X)H_2O + Heat \rightarrow (2X+0.5Y)H_2 + (X)CO_2 \qquad \text{Equation 3:}$$

Using the prototype system, between slightly less than one gallon to approximately 1.3 gallons of water was used per each U.S. gallon of unleaded gasoline. Such a ratio produces hydrogen on the order of 290,000 ppm, which is well above the 180,000 ppm level at which hydrogen is combustible. It should be noted that a greater ratio of water to gasoline (e.g., up to 1.72 gallons of water per gallon of gasoline) could be used in drier climates or conditions and that less water could be used when the humidity is high. Because of the effect of humidity, a humidity sensor is preferably employed to sense the humidity of the ambient air and a controller may then regulate the supply of water based upon the sensed humidity. It should also be noted that the ratio of water to fuel will also vary based upon the fuel that is used. For example, if pentane ($C_5H_{12}$) were used, much more water can be added, whereas if propane were used, much less water need be added.

Using the fuel conversion device described below, hydrogen may be produced in sufficient levels using not only gasoline, but also using any other form of hydrocarbon fuel, such as diesel fuel, alcohol, methane, or ethane without requiring significant modifications to the vehicle. Thus, the present invention affords a much greater flexibility than existing fuel supply systems.

Based upon experiments conducted with the prototype engine, the resultant exhaust gasses consist primarily of carbon dioxide, oxygen, water vapor, and some minute amounts of unburned hydrocarbons. Emissions testing of the prototype vehicle at 1100 rpm and normal engine temperature exhibited HC levels between 13–19 ppm, $Co_2$ levels between 14.0 and 14.2 percent, NOX levels between 15–22 ppm, CO levels between 0.03 and 0.12 percent, and $O_2$ levels between 1.8 and 2.2 percent. Accordingly, the present invention significantly reduces the levels of pollutants otherwise exhausted from conventional engines.

The prototype vehicle was further found to start up immediately upon ignition thereby indicating that hydrogen was being generated immediately upon start-up. Thus, the fuel conversion device of the present invention can be used to supply hydrogen to a fuel cell immediately upon start-up thereby avoiding the need for pressurized storage of hydrogen and expensive batteries to provide electricity to the electric motor while the fuel supply warms up, as is the case with other hydrocarbon-to-hydrogen supply systems for fuel cells. Further, the device does not rely upon the heat generated by the engine itself to produce hydrogen.

Figure 2:
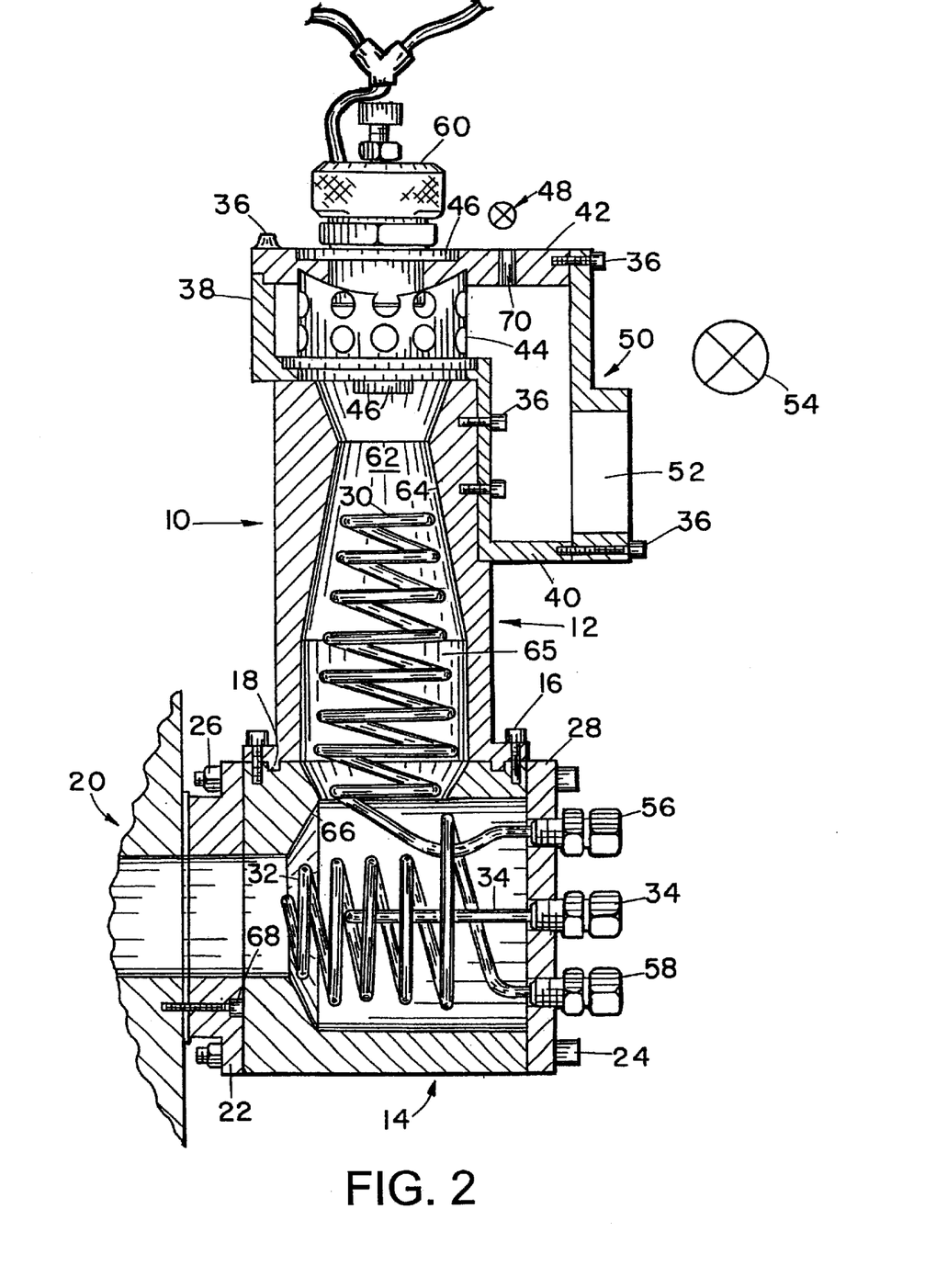
FIG. 2 is an elevational cross-sectional view of a fuel conversion device constructed in accordance with a first embodiment of the present invention.
Figure 3:
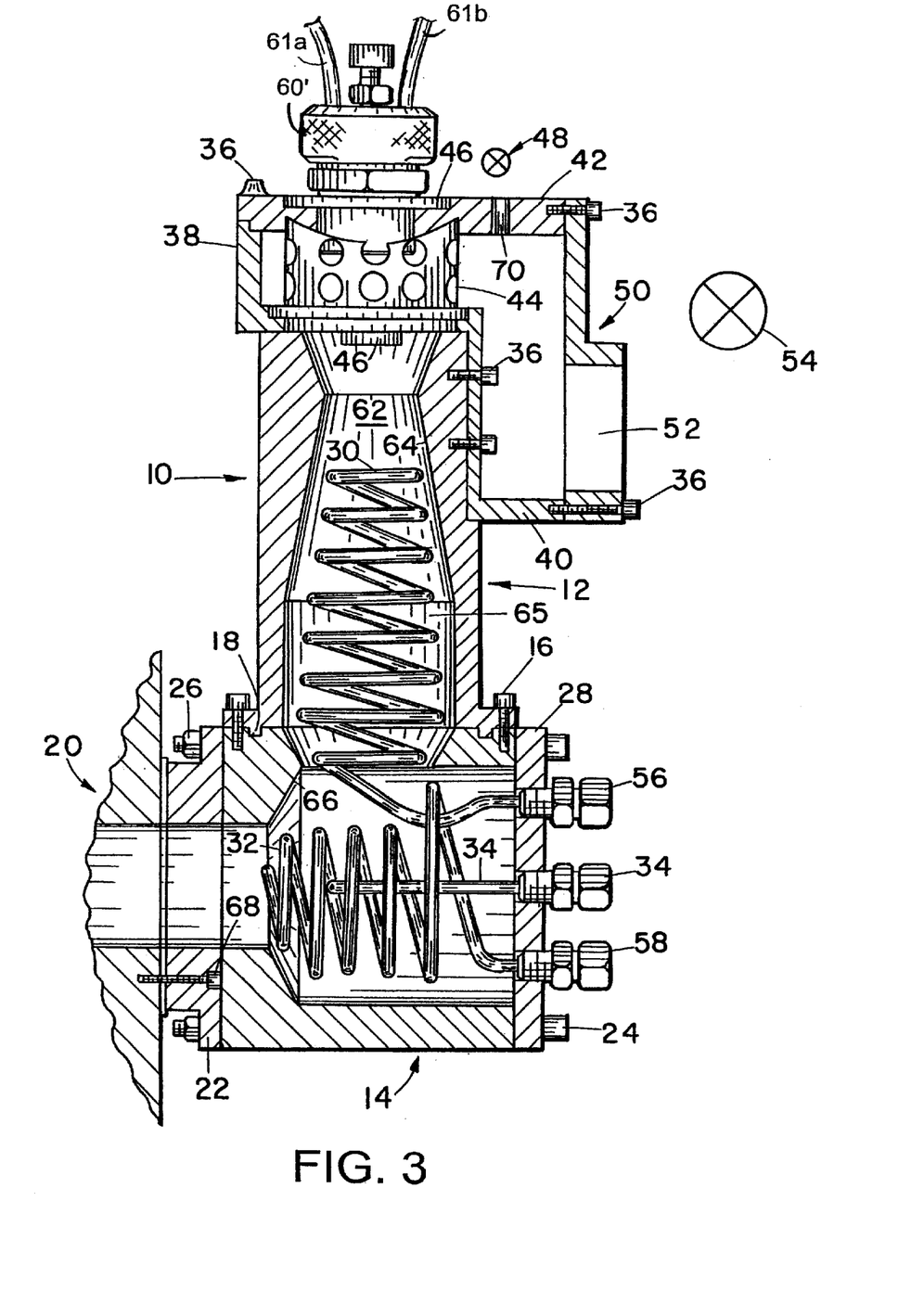
FIG. 3 is an elevational cross-sectional view of a fuel conversion device constructed in accordance with a second embodiment of the present invention.

FIG. 2 shows the detailed construction of a fuel conversion device 10 according to a first embodiment of the present invention. The first embodiment as illustrated represents the structure used for a prototype that was constructed and tested for use with an internal combustion engine. The prototype was used on a six cylinder engine in a full size pick-up truck. Typically, such conventional full size pick-up trucks obtain fuel economies of no greater than 15 miles per gallon. With the prototype fuel conversion device and the supply of 1.1:128 to 1.5:1 water to fuel ratio, the prototype system obtained greatly improved fuel efficiency. Certainly, for a smaller vehicle and engine, much greater fuel efficiencies could be obtained.

Referring to FIG. 2, the fuel conversion device 10 is shown to include outer vertical and horizontal housings 12 and 14 formed from generally cylindrical bodies defining the peripheries of the housings. Housings 12 and 14 together define a fuel, water, and air mixing and gasifying chamber 65, which is here shown to contain two interconnected portions. This vertical to horizontal arrangement was to accommodate the engine intake manifold of the prototype assembly. Housings 12 and 14 could be aligned and could be just one housing forming the one chamber. Within chambers 12 and 14 are heating elements 30 and 32, which provide sufficient heat to convert a mixture of small sized (preferably, less than 50 microns in diameter and more preferably less than 10 microns in diameter) fuel and water droplets supplied from a nozzle 60, into hydrogen. The heating coils 30 and 32 shown in chambers 12 and 14 have a random configuration. The fuel/water mixture is preferably transformed by an endothermic addition of thermal energy combined with sufficient time converting the fuel/water mixture to hydrogen and harmless byproducts. The conversion device includes heating means for simultaneously heating the water, air, and fuel to a temperature at which the fuel and water convert to hydrogen. In this particular arrangement, the heating means includes two heater coils 30 and 32. While this is advantageous, one coil or more than two heaters could be used, provided they are controlled as set forth hereinafter. As used and described herein, the term "heating means" includes the disclosed heater coil(s) and their equivalents. As stated above, any system or device that heats the hydrocarbon fuel with engine exhaust or burning hydrogen supplied from a tank are not considered equivalent structures to the disclosed electrical heater coil(s) due to their slower cold starts and requirement for pressurized hydrogen storage.

Housings 12 and 14 are formed to define a vaporization chamber 65 having a plurality of venturis 64 and 66. Providing the plurality of venturis is advantageous to assure turbulence and uniform mixing of fuel, water, and air, particularly when the gaseous mixture changes direction. The lower end of housing 12 is attached to underlying housing 14 by several cap screws 16. A seal between the housings is formed by machining an annular male ring 18 fitting into a corresponding annular female slot cut into the top of housing 14. Housing 14 serves several functions including that of 90° flow transition between primary housing 12 and the conventional internal combustion engine intake manifold 20. To aid mounting, an adapter plate 22 is shown mounted to the inlet of intake manifold 20 using cap screws 68 recessed beneath the machined surface of adapter plate 22. A fuel proof gasket is provided between adapter plate 22 and housing 14. Long bolts 24 pass through a cover plate 28, housing 14, adapter plate 22, and lock nuts 26 to secure fuel conversion device 10 to intake manifold 20. Cover plate 28 is drilled and tapped to receive the connector ends of heating coils 30 and 32 and an optional process temperature sensor 34.

The upstream end of housing 12 is attached by cap screws 36 to transition housing members 38 and 40. An end cover plate 42 is attached to transition housing member 38 with cap screws, retaining an annular air distribution ring 44 securely in grooves machined into cover plate 42 and housing 12. An outer recess in cover plate 42 receives a cylindrical nozzle adapter assembly including nozzle 60 and a nozzle extension tube 46. Cover plate 42 is drilled and tapped to receive a control valve 48 (shown schematically) to control ambient combustion air through an inlet 70 for engine idling. This valved air inlet can also be used for turbo-charged acceleration air. It could be used as an alternative to a throttle plate inlet 52 or in conjunction therewith. Annular ring 44 is generally cylindrical in cross section, with a series of air inlet openings around its periphery. These inlet openings can be circular, as shown, or of other shape such as elongated slots. The inflowing air shifts from flowing radially inward to axially down around the periphery of axially extending nozzle extension tube 46.

The evenly spaced holes in annular ring 44 have diameters such that the total cross-sectional area, i.e., of each hole, times the number of holes, substantially equals the cross-sectional area of inlet 52 or of a throttle plate 54. The unique construction of the annular ring serves to snuff out backfiring.

Upstream of the annular distribution ring 44 and attached to housing 40 is a cover plate 50. The principal ambient air inlet 52 is in cover plate 50. Attached to cover plate 50 directly above inlet 52 is the main throttle body plate assembly 54 (shown schematically) for controlling ambient air supply.

The nozzle extension tube 46 adjacent zone 62 serves to both secure nozzle 60 within the device and also act as a barrier to ambient air passage across the tiny nozzle discharge droplets until just prior to the throat of venturi 64 and into turbulent mixing zone 62 of chamber 65. This barrier function effectively wards off undesired effects at the nozzle tip, and promotes decelerated and thorough, even mixing of ambient air, and the small sized droplets once the turbulence generated by venturi 64 comes into play. The size and shape of the nozzle can vary. The preferred size is about 0.028 inch in diameter. The preferred spread angle is about 22°. Additionally, nozzle extension tube 46 works with annular distribution ring 44 in such a manner as to cause distribution of ambient air through the evenly spaced, circumferentially arranged holes in annular distribution ring 44. Due to the differing distances that different air molecules have to travel to reach the distribution holes from the lateral air inlet, coupled with the lower pressure environs of an intaking engine cylinder, a turbulent rotating air mass emerges from annular ring 44 and comes into mixing contact with the spreading, i.e., diverging, yet dense homogeneous stream of small sized fuel and water droplets emanating from nozzle 60, helping to diminish the droplet mass concentration just prior to the introduction of additional generated turbulence by the differential pressure areas associated with venturi 64. Turbulence is further enhanced by the tumbling caused by flow of the mixture through and around coils 30 and 32, along with additional pressure differential turbulence at the second venturi 66. The housing taper in the initial gasification/mixing housing 12 and downstream of venturi throat 64 are also preferably 20° to correspond with the spray spread and shape of nozzle 60. Nozzle 60, chosen for the prototype device because of its spread angle and its capacity in gallons per hour at specified differing PSIG air inputs, is preferably a Model SU2A from Spraying Systems Colo., P.O. Box 7900, Wheaton, Ill. 60189-7900 USA or a Model AL-1 nozzle from Delavan Corporation of England. However, many different nozzles could be used to deliver small sized droplets of fuel and water. The respective spray pattern angle would influence the corresponding taper in, and size of, housing 12. Air from a dedicated air pressure source is delivered to the nozzle via an electronic air pressure regulator with a preset initial air pressure value and preset pressure range values. Determination of the preset initial air pressure to be delivered to the nozzle is dependent on desired nozzle fuel and water output. Nozzle output is largely a function of liquid density and siphon height or gravity head to the fuel reservoir and air pressure through the nozzle.

According to the first embodiment, fuel and water are supplied to nozzle 60 from their respective tanks via two separate supply lines that are connected to the nozzle inlet using a Y-adapter. Thus, alternating fuel and water droplets are introduced to nozzle 60.

Coils 30 and 32 are secured to and have their leads extend through cover plate 28. Also secured to and having its lead extend through cover plate 28 is the optional temperature sensor 34. Integrated within coils 30 and 32 are temperature sensors 56 and 58. A combination of coil types is possible. Heated liquid (>140° F.) could be used as a heat transfer medium in either or both coil 30 and coil 32. Alternatively, either or both coils 30 and 32 could be the preferred choice, which is an electrical resistance heating coil. Development favored the use of electrical resistance coils with microprocessor burst firing control. Three such sensors are shown in FIG. 2. Process temperature sensor 34 works in conjunction with the microprocessor controlling the firing of coils 30 and 32, while sensors 56 and 58 which are an integrated part of coils 30 and 32 act as sensors which, in combination with power limiters, set high temperature limits for coils 30 and 32.

As noted previously, housing 14 is shown at 90° to housing 12 to facilitate the flow of the gaseous fuel/water mixture from the fuel conversion device 10 to an existing internal combustion intake manifold 20. In other applications, housings 12 and 14 could be arranged linearly or combined as one housing to accommodate physically different intake manifold configurations, as described above.

In operation, coils 30 and 32 supply heat. Tiny micron sized fuel and water droplets and a small amount of air are supplied by nozzle 60. As the engine turns over, a partial vacuum within the combustion chamber draws ambient air past idle control valve 48 through the distribution holes in annular distribution ring 44 to the zone or region 62 past the end of nozzle extension tube 46 where it is entrained with the dense flow, small sized fuel and water droplets coming from nozzle 60. Turbulence in the ambient air caused by flow through the annular distribution ring 44, augmented by turbulence generated by differential pressure associated with venturi 64, initiates the mixing of the small sized fuel and water droplets together with ambient idle air. Additional turbulence is provided by collision with the downstream coils 30 and 32. Mixing continues to be aided by pressure differential generated by venturi 66. As the fuel/water/air mixture tumbles through the influence of coil 30, thermal energy is absorbed both by direct collision with and radiation from coil 30, beginning the endothermic reaction leading to the generation of a hydrogen/air mixture.

A fuel conversion device 10' according to a second embodiment of the present invention is shown in FIG. 3. In FIG. 3, the same reference numerals as used to described the first embodiment are used to describe like components of the second embodiment. As will be apparent from a comparison of FIGS. 2 and 3, the only difference between the first and second embodiments is that the single inlet nozzle 60 of the first embodiment is replaced with a nozzle 60' having two inlets 61*a* and 62*b* for separate connection to the fuel and water tanks. In this manner, the water and fuel are not mixed until after they have been injected as small droplets into nozzle extension tube 46.

Figure 4:
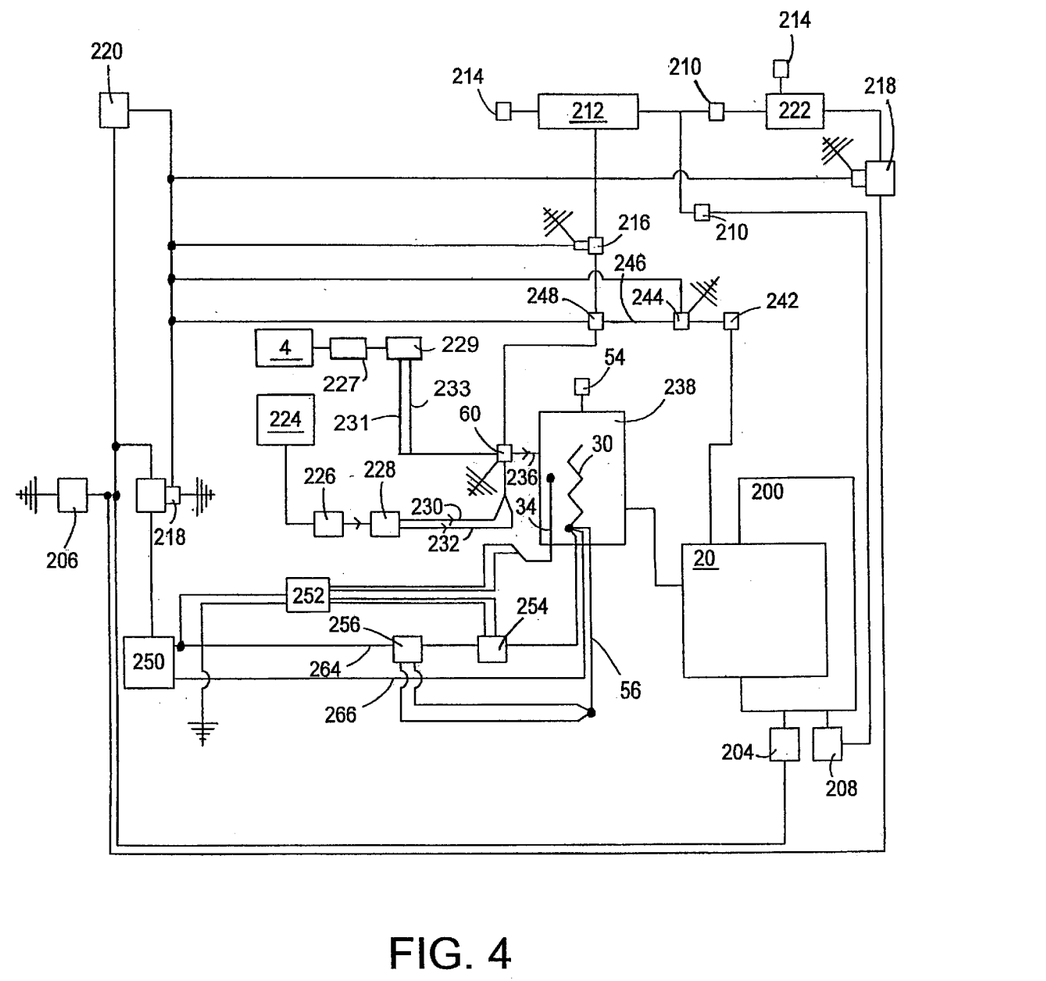
FIG. 4 is a schematic block diagram of a combination engine and fuel supply system including computer processor controls according to the present invention.
Figure 5:
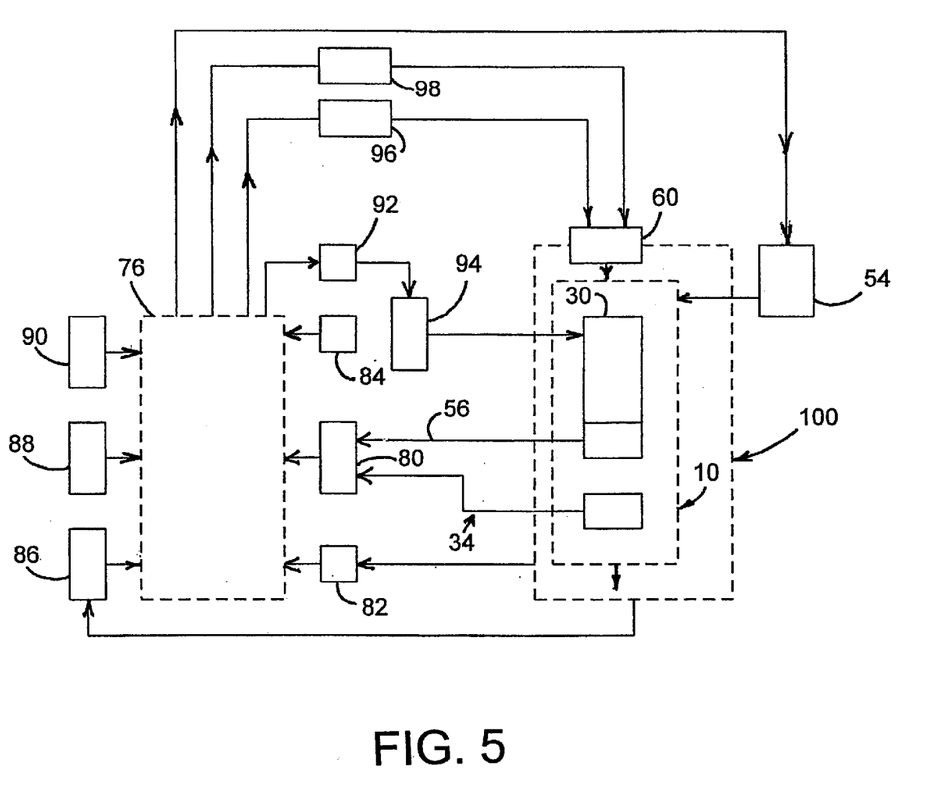
FIG. 5 is a schematic block diagram of the fuel supply system control subsystem according to an alternative embodiment of the present invention.

The manner in which fuel and air pressure are controlled for supply to nozzle 60 and the manner in which heater coils 30 and 32 are controlled is described below with reference to one embodiment of the control system of the present invention as shown in FIG. 4 and an alternative embodiment as shown in FIG. 5. The control system shown in FIG. 4 represents computerized controls and inverted 120 v, AC electrical circuitry used to run the prototype conversion device/engine combustion.

Listed by number are the following prototype components used in the first embodiment of the central subsystem as shown in FIG. 4:
200 Internal combustion engine
Intake manifold of internal combustion engine
204 Engine driven alternator
206 12 v DC battery
208 Engine driven air pump
210 Check valves
212 Air storage tank
214 Pressure relief valves (2)
216 NC 12 v DC solenoid
218 NC 12 v DC continuous duty solenoid (2)
220 Ignition switch
222 Auxiliary air pump
3 Fuel tank
4 Water tank
226 Fuel pump
227 Water pump
228 Fuel metering device
229 Water metering device
230 Idle fuel conduit
231 Idle water conduit
231 Run fuel conduit
233 Run water conduit
60 Nozzle (SU2A Spraying Systems Co., Wheaton, Ill. or AL-1 Delavan Corporation, England)
236 Injector of micron droplet fuel/water/air mixture
54 Ambient air control valve
242 Vacuum diaphragm
244 Piezo-electric device
246 Variable voltage signal
248 Electro-pneumatic pressure regulator from Proportion-Air Inc., McCordsville, Ind.
250 12 v DC to 120 v AC converter
252 Microprocessor-based Auto Tuning Control from Watlow Controls, Winona, Minn.
254 Solid state relay control from Watlow Controls, Winona, Minn.
256 Temperature limit/Control from Watlow Controls, Winona, Minn.
258 Air line
30 120 v AC cable resistance heater w/internal "J" thermocouple from Watlow World Headquarters, St. Louis, Mo.
34 "J" thermocouple sensor from Watlow Gorcon, Richmond, Ill.
56 Thermocouple leads from heater coil 30
264 120 v AC power lead L1
266 120 v AC power lead L2

The controlled quantities of ambient air and tiny fuel and water droplets will change, often very rapidly, as demands placed upon the internal combustion engine change. The more demand placed upon the engine, the more ambient air, fuel and water droplets, and thermal energy required. Conversely, lessening demands require less fuel, less water, less air, and less thermal energy. Rapidly changing demands, such as are experienced when the internal combustion engine is used as a source of power for an automotive vehicle, require very rapid response times for control of, in particular, fuel and water demands and thermal energy supplied by the heating coils.

Fuel conversion devices as illustrated by the proposed invention require sophisticated controls to respond quickly and safely to changing engine demands. Experience working with the prototype has shown that instantaneous engine starting, fuel economy and low emissions require adequate in the endothermic heat of vaporization supplied during the fuel conversion process. A steady source of endothermic heat was tried and proved to be unacceptably slow in meeting low emission engine starts. 12v DC heat sources were attempted but proved to also be slow in providing sufficient thermal output to complete fuel conversion during high engine demand, due to unacceptably high amperage demands on the 12 v DC system. 120 v AC, 220 v AC and 440 v AC resistance heaters were known to provide sufficient thermal output, but were initially thought to perhaps be too uncontrollable.

Design criteria called for finite control of fuel and water droplets regardless of engine performance demands. The resultant solution called for finite control of small sized fuel and water droplets coupled with finite control of heat of vaporization. Microprocessor controls were therefore provided to meet finite control and safety.

Thermal energy supplied to the fuel conversion device to provide endothermic heat of vaporization results from distributed wattage along the two cable heaters 30 and 32 within the gasification chamber. These resistance heaters operate at 120 v AC and are capable of attaining 1100° F. interior temperatures and equally hot surface temperatures within seconds of receiving power. Limiting supplied voltage results in temperature control so that safety limits are not exceeded, but also limits BTU output when less heat of vaporization is needed. Control of thermal energy at needed but safe levels is achieved by monitoring the temperature within vaporization chamber 65. Safety limits are assured by placing a temperature limit controller 256 in series between the power source 250 and the solid state firing relay 254. The temperature limit control 256 receives input from "J" thermocouple sensors 56 and 58, which measure internal coil temperatures and are embedded within resistance coils 30 and 32, respectively. Preset limits within the control 256 are compared to actual coil temperatures, and if exceeded, power is denied to the firing relay 254 and to the coil until coil temperature drops below the preset safety temperature. Thus, microprocessor power controls keep coil temperatures within safety limits.

If preset temperature limit safety criteria are met, power is supplied to the firing relay 254. The auto tuning control 252 determines how long the coil 30 is to be fired (duration) at full power to achieve a process temperature set in the auto tuner 252, which is compared to input temperature from a "J" thermocouple sensor 34 inserted near the end of the vaporization chamber within fuel conversion device 10. The solid state firing relay burst fires the coil at the zero point on the sinusoidal wave associated with 120 v AC 60 cycle current. This zero firing effectively controls temperature overshoots and adds tremendously to the life of the resistance heaters. The thermal process temperature set into auto tuner 252 may be set to reflect driving demands (i.e., load and ambient outside air conditions).

Temperature sensor 34 senses the temperature of the combustion mixture of small sized fuel and water droplets introduced into gasification housing 12 through inlet conduit 46 and entrained with ambient air passing through annular air distribution ring 44 from inlet air controls 54 and 48 and turbulence zone 62. Temperature sensor 34 supplies the sensed temperature of the combustion mixture to the microprocessor in auto tuning control device 252. The microprocessor compares this sensed temperature to a preprogrammed default temperature of, for example, a temperature in the range of 100 to 225° F., and outputs a 4–20 mA signal to a microprocessor in a firing relay control 254, which time proportions the electrical current passed through resistance coils 30 and 32. The turbulent mixture of ambient air and tiny fuel and water droplets absorbs thermal energy from coils 30 and 32, through radiation and/or through direct collision with coils 30 and 32, sufficient to complete the vaporization and conversion to hydrogen prior to entering engine intake manifold 20.

The fuel and water droplets are introduced by an injector, preferably nozzle 60, with the aid of a small amount of air called "assist air." Pressure increases in nozzle air will cause a corresponding increase of fuel from a metered source 228. To facilitate changes in air pressure to meet changing engine fuel needs, the direct relationship between engine load and engine vacuum is utilized. Greater load creates less engine vacuum. Conversely, lessening loads increase vacuum. A vacuum diaphragm 242 attached to a resistance spring operates a mechanical linkage attached to a piezo-electric device 244. Vacuum increases decrease the variable voltage generated by piezoelectric device 244. Conversely, dropping engine vacuum (under load) causes increasing variable voltages. The variable voltage operates as a signal 246 to an electro-pneumatic air pressure regulator 248 having a microprocessor, which regulates air pressure dependent upon input voltage signals 246 from piezo-electric device 244. An initial set point and total pressure range preset in the microprocessor of electro-pneumatic air pressure regulator 248 allow for variable pressure changes to nozzle 60 to be dependent upon engine loading. Throttle position and change in throttle movement, both in direction and speed, could be translated as input signals to provide even more finite control of assist air, as illustrated in FIG. 5 and described in greater detail below. These components are more specifically described hereinafter.

Referring specifically to the schematic diagram in FIG. 4, fuel is delivered to a fuel metering device 228 from fuel tank 3 using a positive pressure fuel pump 226. The fuel pump may be dependent upon nozzle injector 60 to be of either constant or variable pressure. Dependent upon nozzle injector 60 type and engine idle demand, idle fuel may have to be metered and supplied through conduit 230 independent of power engine demands. Increased demand for fuel may require additional metering of fuel through parallel conduit 232. Similarly, water is delivered to a water metering device 229 from water tank 4 using a water pump 227. Again, the water pump may be dependent upon nozzle injector 60 to be of either constant or variable pressure. Depending upon nozzle injector 60 type and engine idle demand, idle water may have to be metered and supplied through conduit 231 independent of power engine demands. Increased demand for water may require additional metering of water through a parallel conduit 233.

In the prototype, nozzle injector 60 of external mix siphon feed was chosen for its small micron-sized liquid droplet performance characteristics. Such a nozzle requires a small amount of air to accomplish the production of small micron fuel and water droplets. Many other nozzle types using changing liquid pressure, with or without air assistance, to mechanically produce small droplets, could be used. Air to assist in nozzle injector functioning is supplied from an air tank 212 with its pertinent filtration and pressure relief valve 214. This air supply is controlled as on or off by a 12 v DC solenoid valve 216 wired to the ignition switch. Air supply to air tank 212 is provided by an auxiliary air pump 222 or, if the engine is running, by an engine driven air pump 208.

When the ignition is turned on, circuits are opened allowing air passage from the tank through solenoid 216 to the electro-pneumatic pressure regulator 248. This device allows for changing air pressure to nozzle injector 60. A variable voltage and/or milli-amp signal in line 246 (the prototype uses variable voltage 0–10 v DC) is generated by piezo-electric device 244 coupled to a vacuum diaphragm 242, which is in turn connected to the intake manifold 20. Once the engine has fired and remains at idle, vacuum diaphragm 242 resists spring tension to influence the piezo-electric device 244, sending a steady signal to the electro-pneumatic regulator 248 which has been set to supply, together with metered fuel in conduit 230 and metered water in conduit 231, the precise amount of air necessary to provide a very lean, low-pollution-producing hydrogen/air mixture delivered to fuel conversion device 10. Once engine demand changes as during acceleration, a resultant instantaneous drop in engine vacuum occurs, causing the spring in vacuum diaphragm 242 to advance the movement of the sliding wire in piezo-electric device 244, which in turn instantaneously increases the voltage signal to electro-pneumatic pressure regulator 248, allowing for an increase in air pressure to nozzle-injector 60 facilitating increased fuel and water flow. Engine demand changes could also be initiated by throttle valve 54 changes or load changes, such as are experienced when automotive vehicles go up or down a hill. Experience has shown that additional input from device 244 associated with throttle movement, throttle speed, and throttle position helps to fine-tune the fuel delivery system.

Opening and closing ambient air control valves 48 and 54 initiates immediate changes in engine vacuum, which is reflected by changes in the amount of fuel and water droplets generated by nozzle 60. Decreasing engine demand leads to decreases in the amount of fuel and water delivered. Less fuel and water passing through coils 30 and 32 require less energy for the mixture to remain at a preset mixture temperature as sensed by sensor 34. Excess thermal energy causes an increase in mixture temperature, which triggers a change in the sensor 34 signal to the computer. Deviation upward from the preset default temperature, which may be between 100 to 225° F., for example, causes a signal change to the firing control relay 254 causing a time-proportional slow down in the energizing of the electrical resistance coils 30 and 32, resulting in lower coil temperatures with less thermal output. Should coil temperatures reach a safety temperature maximum, signals generated continuously by sensors 56 and 58 would activate circuitry in temperature limit controls 256 to interrupt power flow to coils 30 and 32.

The preferred embodiment of the fuel conversion device thus provides one or more devices for injecting small micron sized fuel and water droplets, means to entrain the fuel and water droplets with ambient air, and a vaporization chamber together with heating coils for vaporizing the entrained fuel/water mixture to generate hydrogen. These components could include physical shape variations to accommodate differing engine intake requirements. The preferred components illustrated in FIG. 4 as reflecting the prototype employs computer control of fuel delivery and heating coil performance. The fuel conversion device can be built to perform safely using mechanical controls, liquid heat mediums within the coils and standard, off-the-shelf explosion-proof solenoids. The prototype uses various segregated microprocessors to control fuel flow and heating coil thermal output. An inverter 250 changing 12 v DC current to 120 v AC current maximizes heating coil performance. Treating the gasification process as a thermal process utilizing microprocessor controlled, electrical resistance heaters, together with temperature limit controllers, assures safe, efficient, responsive heating coil performance.

The fuel conversion process is further aided as the mixture continues past coil 32. The resulting hydrogen, which arrives at the combustion chamber, provides more complete combustion than today's carburetor and injector fuel-air mixtures. Experimentation has shown that the engine fires immediately and continues to run smoothly. Changes in engine demand are reflected as changes in fuel/water/air demand. Providing sufficient engine power to accelerate requires increased engine rpms. Specifically, the throttle plate 54 is opened for increased air flow, causing a decrease in engine vacuum. These engine vacuum changes acted upon the vacuum diaphragm 242 causing mechanical diaphragm movement, which is translated by piezo-electric device 244 into a changing voltage signal sent to electro-pneumatic regulator 248. Electro-pneumatic regulator 248 through its microprocessor, using preset initial pressure and pressure range, regulates air pressure output from a high pressure storage tank 212. Increased engine demand such as is experienced during acceleration is accompanied by an immediate decrease in engine vacuum. Combining a vacuum diaphragm 242 coupled to a piezo-electric sliding wire device 244 provides an immediate variable input signal to electro-pneumatic pressure regulator 248 indicative of engine demand, as reflected by engine vacuum. Engine vacuum decreases are reflected as fuel increases. As automotive vehicle momentum change rates are met, less fuel and water are required to maintain established momentum. Less engine demand provides greater engine vacuum, less air pressure to nozzle 60, and decreased fuel and water requirements.

FIG. 5 shows an alternative embodiment of the control subsystem of the present invention. Control of the inventive fuel conversion device 10 is safely and efficiently performed by a fast (preferably 32 bit architecture) central processing unit (CPU) 76 receiving thermal inputs 80, exhaust inputs 82, ambient air inputs 84, engine inputs 86, fuel inputs 88, water inputs 89, and assist air inputs 90. Thus, the various segregated microprocessor functions of the first embodiment may be embodied and performed by a single CPU 76. CPU 76 generates and supplies an output control signal to heater firing relay 94 and temperature limiter 92 efficiently for safely firing heaters 30 and 32. Additional CPU output control signals are supplied to electronic controllers 96 and 98 (FIGS. 2 and 5), which in turn regulate fuel and water flow rates to injector nozzle 60. Ambient air inlet control valve 54 receives another control signal output by CPU 76 to complete the control and management of ambient air, fuel, water, and thermal energy embodied in conversion device 10 to power internal combustion engine 100. Inputs from sensors 34, 56 and 58 in combination with other pertinent data, as illustrated in FIG. 5, are digitally processed to heat generation by coils 30 and 32 regardless of engine demands and/or ambient air temperature/pressure changes.

As illustrated in FIG. 5, in addition to signals generated by devices coupled to engine vacuum, signals reflecting throttle position, throttle position change rate, outside air temperature, barometric pressure and engine operating temperature could, in combination with coil temperature inputs and process temperature inputs, be computed by CPU 76 or a "fuzzy logic" board to provide immediate finite control signals. These outputs sent to controllers would insure maximization of performance and economy while simultaneously minimizing exhaust pollutants.

Another possible method of process control would include additional inputs and fuzzy logic control outputs to firing and limit controls. Variables such as, but not limited to, relative humidity, fuel type or composition, throttle movement, coolant temperature, cylinder head temperature, exhaust gas temperature, manifold vacuum, and density altitude would, if inputted to a fuzzy logic board, allow for outputs to controllers capable of infinite adjustments to the fuel conversion device. Such infinite control would shorten response time, increase engine power, and keep pollutants at a very low level regardless of engine demands. These and various other modifications could be made to the illustrated and presently preferred embodiments depicted without departing from the inventive concept. Therefore, the invention is not intended to be limited to the illustrated embodiments shown, but only by the scope of the appended claims and the equivalents thereto.

The invention claimed is:

1. A fuel supply system for an internal combustion engine comprising:
    a water supply for supplying water;
    an air inlet;
    a fuel supply for supplying fuel; and
    a conversion device coupled to said water and fuel supplies and said air inlet for mixing the air with the water and fuel and thereby converting the water, air, and fuel into hydrogen and byproducts, and for supplying the hydrogen to the internal combustion engine, said conversion device including heating means for simultaneously heating the water and fuel to a temperature at which the fuel and water convert to hydrogen.

2. The fuel supply system as defined in claim 1, wherein said conversion device includes a vaporization chamber having a nozzle for introducing fine droplets of fuel and water into said vaporization chamber and an outlet for supplying the generated hydrogen and air to the internal combustion engine wherein said inlet introduces turbulent air into said chamber.

3. The fuel supply system as defined in claim 1, wherein said fuel supplied from said fuel supply is a hydrocarbon fuel.

4. The fuel supply system as defined in claim 3, wherein said fuel supplied from said fuel supply is gasoline.

5. The fuel supply system as defined in claim 1, wherein said water and said fuel are supplied to said conversion device in substantially equal quantities.

6. The fuel supply system as defined in claim 1, wherein said heating means includes at least one electrical heater coil provided in said vaporization chamber.

7. A fuel supply system for an internal combustion engine comprising:
    a water supply for supplying water;
    an air inlet;
    a fuel supply for supplying fuel; and
    a fuel converter coupled to said fuel and water supplies for receiving water and fuel in a mix ratio of between slightly less than 1:1 and about 1.72:1, and coupled to said air inlet for mixing and thereby converting the water/fuel mix and air into a different form and supplying the converted water/fuel mix and air to an internal combustion engine, said fuel converter includes heater means for simultaneously heating the fuel, water, and air to a temperature at which the fuel and water generate hydrogen.

8. The fuel supply system as defined in claim 7, wherein said conversion device includes a vaporization chamber having a nozzle for introducing fine droplets of fuel and water into said vaporization chamber and an outlet for supplying the generated hydrogen and air to the internal combustion engine wherein said air inlet introduces turbulent air into said chamber.

9. The fuel supply system as defined in claim 7, wherein said fuel supplied from said fuel supply is a hydrocarbon.

10. A fuel conversion device for supplying fuel to a vehicle propulsion system, said apparatus comprising:
   a vaporization chamber;
   an inlet nozzle for introducing fine droplets of fuel and water into said vaporization chamber;
   an air inlet for introducing air into said vaporization chamber to create turbulence in said chamber;
   an electrical heater in said vaporization chamber for heating the turbulent fuel/water mix at a temperature that causes the mix to generate hydrogen; and
   an outlet for supplying the generated hydrogen to the vehicle propulsion system.

11. The fuel conversion device as defined in claim 10, wherein the propulsion system is a fuel cell system and said outlet is adapted to be coupled to an inlet of a fuel cell.

12. The fuel conversion device as defined in claim 10, wherein the propulsion system is an internal combustion engine and said outlet is adapted to be coupled to the internal combustion engine.

13. The fuel conversion device as defined in claim 12, wherein the internal combustion engine is that of a hybrid vehicle.

14. The fuel conversion device as defined in claim 10, wherein said fuel supplied from said fuel supply is a hydrocarbon.

15. The fuel conversion device as defined in claim 10, wherein said water and said fuel are supplied to said conversion device in a ratio between slightly less than 1:1 and about 1.7:1.

16. A fuel conversion device for supplying fuel to a vehicle propulsion system, said apparatus comprising:
   a vaporization chamber;
   a first inlet nozzle for introducing fine droplets of fuel into said vaporization chamber;
   a second inlet nozzle for introducing fine droplets of water into said vaporization chamber;
   an air inlet for introducing air into said vaporization chamber to create turbulence in said chamber;
   heater means in said vaporization chamber for simultaneously heating the turbulent fuel/water mix at a temperature that causes the mix to generate a hydrogen/air mix; and
   an outlet for supplying the generated hydrogen/air mix to the vehicle propulsion system.

17. The fuel conversion device as defined in claim 16, wherein the propulsion system is a fuel cell system and said outlet is adapted to be coupled to an inlet of a fuel cell.

18. The fuel conversion device as defined in claim 16, wherein the propulsion system is an internal combustion engine and said outlet is adapted to be coupled to the internal combustion engine.

19. The fuel conversion device as defined in claim 18, wherein the internal combustion engine is that of a hybrid vehicle.

20. The fuel conversion device as defined in claim 16, wherein said fuel supplied from said fuel supply is gasoline.

21. The fuel conversion device as defined in claim 16, wherein said water and said fuel are supplied to said conversion device in substantially equal quantities.

22. A fuel supply system for an internal combustion engine comprising:
   a water supply for supplying water;
   an air inlet;
   a fuel supply for supplying fuel;
   a conversion device coupled to said water and fuel supplies and said air inlet for converting the water, air, and fuel into hydrogen and byproducts, and for supplying the hydrogen to the internal combustion engine, said conversion device including heating means for simultaneously heating the water and fuel to a temperature at which the fuel and water convert to hydrogen; and
   a control circuit coupled to said heating means for preventing said heating means from heating the water and fuel to a temperature greater than 800° F.

* * * * *